Aug. 11, 1931.     H. E. BUCKLEN     1,818,672
WIND OPERATED POWER PLANT
Filed March 10, 1928     5 Sheets-Sheet 3

Inventor
Herbert E. Bucklen

Patented Aug. 11, 1931

1,818,672

UNITED STATES PATENT OFFICE

HERBERT E. BUCKLEN, OF ELKHART, INDIANA, ASSIGNOR TO HERBERT E. BUCKLEN CORPORATION, A CORPORATION OF INDIANA

WIND OPERATED POWER PLANT

Application filed March 10, 1928. Serial No. 260,727.

This invention relates to wind operated power plants.

The conception of power generation contained in my present invention is that of deriving power at high angular velocity and low torque. I employ a driven member or impeller traveling in the current of the wind and exposing as little surface as possible to the wind. My impeller is essentially a high angular velocity device traveling at a peripheral velocity greater than the velocity of the wind, as may be seen from the fact that if the pitch of the impeller is of the order of 45 in. and its diameter is of the order of 5 ft., the tip of the blade will travel over 15 ft., while the wind travels 48 in. Due to the high velocities which are thereby secured, it is desirable that the impeller be constructed to present as little resistance as possible as a side cutting element.

I have conceived the possibility of providing an impeller of the two blade type of my invention, which shall present different effective pitches for different wind conditions, that is to say, I provide a rather extended surface at the tips of the impeller where the leverage is the maximum and arrange to have this area of variable pitch under varying conditions, namely, to assume a steep pitch upon break-away or starting and accelerating, and thereafter to assume a flat pitch during normal running at high velocity. These extended starting surfaces are provided in the shape of ailerons or flag ends free to assume the proper position under the corresponding wind conditions.

As the impeller gains speed, the controlling flag ends or ailerons will assume a more flat pitch by lining up with the leading edge, and in so doing changes the effective pitch of the impeller by its twisting action. This is desirable as the blade tips on an impeller of 11 ft. 6 in. diameter in a 14 mile wind will develop a lineal speed of 60 miles per hour. An accurate positioning or setting of the pitch and tips can be made to accommodate local average wind conditions by a device of my invention. It is possible also to control the speed of the device by controlling the pitch, and one angular speed may be desirable for a wind-driven electric power generating plant, whereas a different angular speed may be desirable for a mechanically driven load such as a water pumping load.

I find that it is desirable to drive electric generating plants at a high angular velocity both because of the fact that they provide a load which has a low starting torque and because a much less expensive and more efficient generator can be produced where high angular velocity of the armature is employed. In the case of a water pumper which must have a slow reciprocating pump rod action lower speed is desirable, and not only can the initial pitch of the impeller be set to secure this, but by the device of my invention the impeller inherently sets itself at such a pitch as will secure a maximum torque within the velocity of the wind for a given speed of rotation of the impeller. This inherent adaptability of the power extracting element is unique.

A number of incidental advantages are secured by the use of this invention. First, as above pointed out, the device of my invention will stand up in winds of tornado velocity because of the small exposed area. Next, due to the higher speed possible with this device smaller mechanism and less expensive mechanism is possible. The flexing of the impeller as above described as between low and high speed keeps ice from forming thereon. The trailing flag ends or ailerons prevent fluttering of the blade in the wind and stabilizes its action. The impeller may be made of sheet metal suitably formed, and hence is durable and inexpensive. It is noiseless and will clean itself in use. There is no danger of splintering due to hail or birds flying into the impeller accidentally. Preferably but not necessarily I make the blades of a light weight metal such as duralumin.

Now in order to acquaint those skilled in the art with the manner of constructing and operating my invention, I shall describe in connection with the accompanying drawings a specific embodiment of the same. In the drawings

Figure 1:
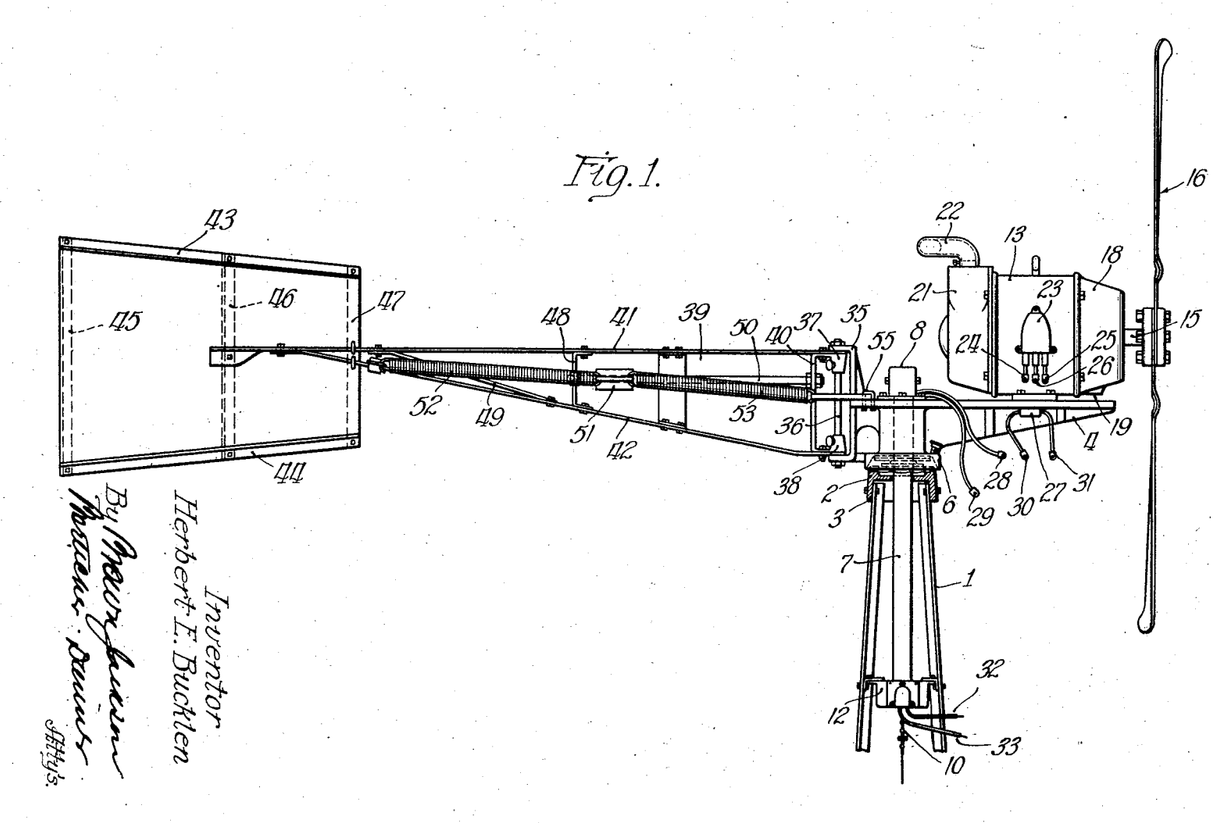
Fig. 1 is a side elevational view of a power plant for developing electrical energy from the wind.
Figure 2:
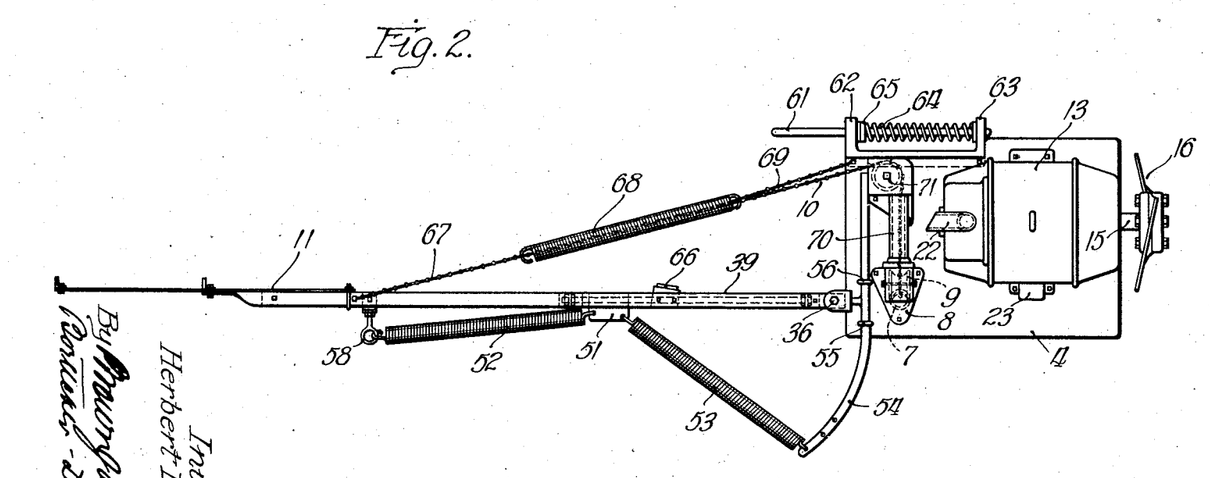
Fig. 2 is a top plan view of the same.

Referring first to Figs. 1 and 2, I mount the power generating plant upon a tower 1 to elevate the same to a position where wind currents of suitable character are encountered. This tower 1 is preferably of four angle-iron corner posts suitably braced together and set on a foundation, the four corner posts being connected together at the top by means of a cast frame cap 2 which has a depending flange or hood 3 within which the upper ends of the corner posts are secured. The upper part of the cap 2 provides a vertical bearing for the platform or turn table 4. The bearing 5 between the turn table and the tower cap is preferably an anti-friction bearing. The platform or turn table has a suitable overhanging flange 6 for protecting the bearing 5 from the weather. The platform or turn table 4 has a vertical mast or spindle 7 secured thereto. This spindle 7 is hollow and passes through the platform or turn table 4, the top of the same being covered by a cap or L-shaped guide 8 within which there is mounted a pulley 9 to permit a reefing chain 10 to be guided for reefing the tail vane 11, as will be described later. A vertical spindle 7 extends down into a housing 12 which contains a radial bearing not shown and collector ring and brush assembly, all as described in the co-pending application, Serial No. 142,134, filed October 16th, 1926, and to which reference is hereby specifically made for a disclosure of the details thereof. The reefing chain 10 extends down through the hollow spindle 7, and is adapted to be operated from the base of the tower. Upon the turn table 4 I mount the generator 13, shaft 15 of which is directly connected to the impeller 16. The generator 13 has an air inlet opening at the bottom of the front cap 18, as indicated by reference numeral 19. It has an air outlet in the rear frame cap 21 through the L-shaped eductor 22. The shaft 15 is preferably mounted in anti-friction bearings, for example ball bearings in the frame caps 18 and 21 to reduce the break-away or starting torque to a minimum. The leads from the generator, three in number, extend out through a lateral hooded opening, a suitable cap or hood 23 being secured over the opening, as will be apparent from Figs. 1 and 2. In the embodiment shown in Figs. 1 and 2, a shunt type of generator is employed, and the three leads comprise the power wires 24 and 25 and a field wire 26, the opposite end of the field in this case being connected to one of the power wires. The field wire 26 is connected to the opposite one of the power wires through a fuse contained in the fuse box 27. The leads 28 and 29 are adapted to be connected, for example, to the connections 24 and 25, and the leads 30 and 31 leading to the fuse 27 are adapted to be connected to the leads 25 and 26 so as to put the field winding in series with the fuse and to connect the power wires to the main leads 28 and 29 leading down inside a hollow spindle 7 to the collector ring structure in the housing 12, the leads from the brushes being shown at 32 and 33 and extending to the base of the tower.

The platform or turn table 4 extends forwardly from the tower 1 a sufficient distance to let the impeller 16 operate in substantially undisturbed wind currents. It will be seen that the longitudinal axis of the propeller and armature shaft 15 is offset with respect to the vertical spindle 7 so as to provide a leverage for a definite purpose, namely to cause the impeller to be driven out of the wind upon approaching a predetermined limit of wind velocity.

The eductor 22 has a diagonally rearwardly and downwardly facing opening to protect the same against the entry of moisture, snow, sleet or the like, and by its trailing in the wind, ventilation of the generator is secured by the same wind which drives the impeller to actuate the generator. The overhang of the rear end of the eductor 22 is so arranged as to shield the opening when the impeller is swung out of the wind against the entry of the wind or foreign matter. In the structure shown in Figs. 1 and 2, impeller 16 is arranged to rotate in a clockwise direction, as viewed from in front of the device. The rear end of the turn table or platform 4 has a U-shaped bracket 35 to provide a vertical bearing for the tail vane 11. A spindle or bolt 36 extends through the arms of the bracket 35 and through the hubs or bearings 37 and 38 of the frame 39 of the tail vane 11. The bearings 37 and 38 are connected by an integral bar of U-shape indicated at 40. The bracket and frame 39 comprise an upper bar 41 which extends substantially straight from the rear to the top of the bearing 37, and a lower inclined bar 42 which extends from the lower bearing 38 diagonally upward to the upper bar 31.

The two bars 41 and 42 are joined to each other and to the tail vane 47 which comprises a sheet or plate of sheet metal suitably stiffened longitudinally by the angle bars 43 and 44 and transversely by the angle bars 45, 46 and 47.

The two bars 41 and 42 are suitably braced as by means of a strut 48 and a diagonal brace 49. The strut 48 is connected to the U-shaped bar 40 by a tension rod 50 for bracing the tail vane frame 39 and for providing guide for the sliding anchor member 51 to which the tension springs 62 and 53 are connected. This movable anchor block 51 is interposed between the two tension springs 52 and 53 and introduces a means for providing a variable tension of these springs. The forward end of the spring 53 is anchored to a bracket arm 54 which projects out from the side of the turn table 4 to a controlled extent, this bar being clamped to the turn table 4 by means of the U-bolts or clamps 55 and 56. Further adjustment of the connection of the spring 53 to the bar 54 is provided by a series of folds into which the end of the spring may be hooked. The rear end of spring 52 is connected to an eye bolt 58 connected to the tail vane frame.

The platform or turn table 4 carries a spring buffer 60 comprising a buffer rod 61 passing through guides in the lugs 62 and 63 and being held extended by compression spring 64 bearing against the bracket lug 63 and a collar 65 secured to said rod 61.

The tail vane 11 and its connected frame 39 swing in the wind laterally in variable peripheral movement and the buffer bracket 66 on the tail vane frame is adapted to engage the end of the buffer rod 61 in case of violent movement of the tail vane in the direction of said buffer.

The tail vane is prevented from swinging too far in the opposite direction by a tie which comprises a chain 67 connected to the forward end of tension spring 68 and chain 69 connected to the other end of the spring 68 and to an anchorage on the platform 4.

The reefing chain which extends over the pulley 9 and through a housing 70 on the platform 4 and thence over a vertically pivoted pulley 71 also contained in a housing extends through the interior of the tension spring 68 and connects to chain 67 at the rear end of the spring 68. The tie of the tail vane to the turn table 4 thus on the upper side includes the tension spring 68 to permit a certain amount of motion of the tail frame within the tension of the spring 68. In the opposite direction the tail vane is restrained from motion primarily by the spring 53 and secondarily by the spring 52.

As the pressure on the forward face of the impeller 16 increased and as its gyroscopic action increases the turn table 4 begins to swing about the vertical spindle 7 in a counter-clockwise direction as viewed in Fig. 2 until the buffer rod 61 engages the buffer bracket 66 on the tail vane. During such motion the effective tension of the springs 52, 53 decreases. The maximum resistance of these springs for holding the platform 4 against rotation with respect to the tail vane 11 occurs in the position shown in Fig. 2; that is, because of the effective radius arm of the spring 53 and due to the fact that motion of the parts rapidly stresses the spring 53 and it does not appreciably stress the spring 52. However, as the parts swing around the effective radius of the arm 54 with respect to the pivot pin 36 becomes less and also more of the tension is transmitted to the spring 52 by forward motion of the sliding anchor block 51.

After the impeller has once been blown out of the wind the buffer 60 tends to throw it back into the wind since the buffer is highly effective, whereas the springs 52 and 53 are substantially ineffective.

Figure 3:
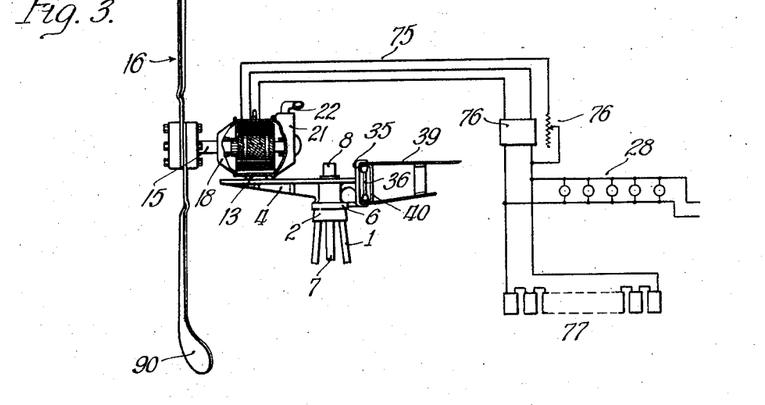
Fig. 3 is a diagram of connections.

Instead of having the fuse for the generator field winding or third brush mounted on the turn table 4, as shown in Fig. 1, I may lead the field wire 75, as shown in Fig. 3, to the base of the tower and provide a suitable field rheostat 76 for controlling the output of the power plant. Preferably the generator is provided with a third brush and made self regulating, as is the practice in automobile charging generators, although that is optional. Suitable control apparatus such as a battery cutout 76, are provided for controlling the connection of the generator to the storage battery 77 or the load 78 is provided, this, however, not being the essence of the invention.

Figure 8:
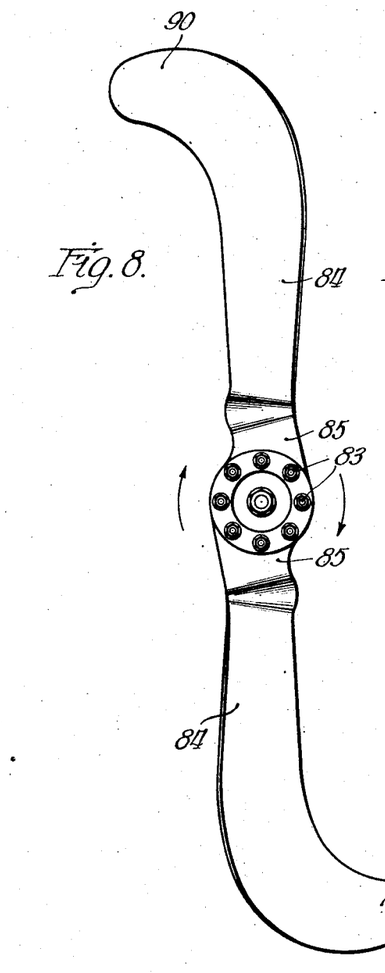
Fig. 8 is a front elevational view of a modified form.
Figure 9:
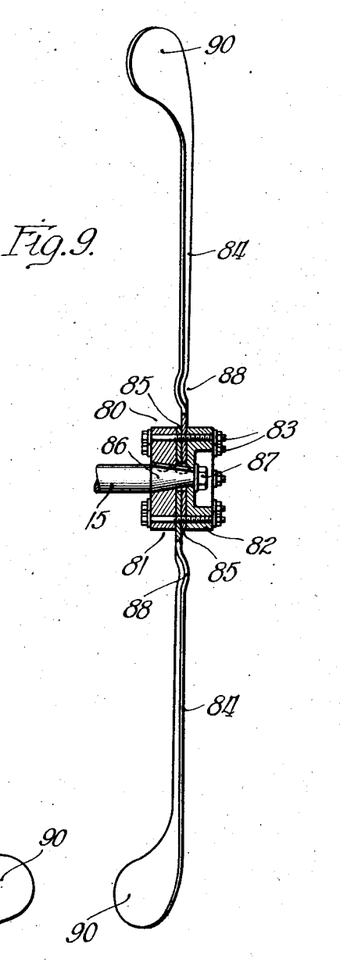
Fig. 9 is an edgewise view partly in section of the impeller shown in Fig. 8.

Referring now to the structure of the impeller 16 shown in Figs. 1, 2 and 3, I wish to call attention to the fact that the specific form of the impeller 16 may be varied within the teachings of my invention. In Figs. 8 and 9 I have shown one embodiment of the same. In this construction there is a hub member 80 composed of two parts 81 and 82 bolted together by a series of through bolts 83 clamping the two halves of the hub together upon the inner ends of the blades. There are two blades shown, but I do not intend to be limited only to two blades, as the invention might be embodied in more than two blades, but from practical experience I have found that there is so little gain in employing more than two blades that the two-bladed impeller is to be preferred. The blades 84—84 are identical in construction, that is, they are duplicates having hub portions 85 matching, with the hub members 81 and 82 to receive the clamping bolts 83. The hub portions 85 overlie each other between the hub parts 81 and 82 so that when the clamping bolts 83 are drawn up the two blades are rigidly secured together. The hub parts 81 and 82 have a suitable tapered socket for receiving the tapered end 86 of the shaft 15, suitable keyways being provided in the hub parts 81, 82, and a clamping nut 87 being threaded to the end of the reduced part of the shaft 15. Suitable keys are set in the tapered portion 86 to engage the keyway in the hub parts 81, 82.

The blade 84 is herein shown as made of sheet metal preferably of an alloy of aluminum now on the market and termed duralumin.

Since the hub portions 85 are flat and the outer parts of the blades are approximately warped surfaces, such change from the hub portion 85 to the inclined outer portion is secured by forming a hump or bend in each of the blades as indicated at 88.

Obviously I do not intend to be limited to such manner of making the hub portions flat and the outer portions inclined, as the entire blade may be suitably shaped by stamping if so desired.

It will be observed that the pitch of the main part of the blades is very flat. At the outermost station the blade is provided with a rearwardly extending portion 90, which I have termed the flag end, and which has a function of great importance. The entire body of the blade down to the hub portion 85 is flexible, and if desired it may be given a camber, that is, a hollowing out longitudinally on the front face and convexing on the back face to stiffen the blade against bending. The flag ends 90 provide a relatively large and effective area, the blades being flexible and the flag ends 90 being eccentrically disposed with respect to the longitudinal axis of the blade. It will be seen that the wind pressure on said flag ends tends to twist the blades about their longitudinal axis. This is the desired action. The pitch of the blades is so flat that the starting torque of the wind pressure at low wind velocities would be insufficient to overcome a static friction. The area of the flag ends 90 is relatively large, and even with the low wind velocity and consequently low wind pressure, will tend to press back or bend said flag ends rearwardly with respect to the main body of the blades. The result is that there is an automatic adjustment of the pitch to start the blade against the static friction tending to hold it, or if the blade is already in motion and the wind velocity suddenly increases the bending back of the flag ends permits of a powerful acceleration in proportion to the increase of wind velocity.

By this arrangement the impeller of my invention has an inherent characteristic providing a high starting torque for a given wind velocity.

As the impeller takes up the proper speed the wind pressure upon the flat ends 90 decreases, with the result that they swing back into a flatter pitch such as they have initially, and automatically provide a flatter pitch suitable for higher velocity of the impeller as a whole.

I believe it is broadly new to provide an impeller of this inherent characteristic, changing its torque in accordance with speed. For a given wind velocity a starting torque is at maximum, and then as the impeller speeds up the torque drops down. By this means the impeller becomes substantially independent of wind velocity in its ability to extract maximum power out of the wind.

The great difficulty heretofore in all devices for extracting power out of the wind has been this—that a rigid blade or sail moving through the wind or relative to it in the nature of a helicoid surface can be made correct for only one given wind velocity and one given speed of rotation. Since the wind is inherently variable, all devices heretofore made have been merely compromises attempting to be substantially correct for a range of wind velocities or a range of speeds or both. According to my invention as herein disclosed I can with one form of impeller blade meet much more closely a wide variety of wind velocities for a given desired speed or load, or carry a wide variety of loads or speeds at a given wind velocity which, so far as I am aware, is wholly new.

I have come to the conclusion that it is desirable to reduce the diameter of the impeller and increase its speed for extracting a predetermined amount of power from the wind. Whereas heretofore I have employed an impeller of the order of 11 ft. 6 in. in diameter traveling at approximately 300 R. P. M. to 325 R. P. M. in a wind velocity of 25 miles per hour and have transmitted the effort of this large impeller through a gear of 3 to 1 to increase the generator speed of the wind electric plant to approximately 900 to 975 R. P. M., I now propose, according to the present invention, to reduce the size of the impeller, increase its velocity and drive the generator directly.

Heretofore I have found in that combination of elements that a 45 to 48 in. pitch of the impeller is desirable. I now make the pitch very much flatter in order to secure the desired increase of speed.

With increasing wind velocities and increasing speed of the impeller within the permissible range the flag ends 90 of the impeller blades will be moved more rapidly through the air, and if the speed of the impeller should increase to a point where the peripheral speed of the impeller ends approaches the corresponding wind velocity, the flag ends flatten out and trail directly in the plane of rotation without, as has heretofore been the difficulty, pumping the wind and thereby losing power. In other words, by my construction the impeller may be run at a rotary speed or angular velocity by a wind operating on the inner stations of the blade to drive the tips and flag ends at a velocity greater than that corresponding to the radius and pitch at which said tips and flag ends are initially set, and such flag ends tend to trail in the wind with less loss of power than has heretofore been possible in devices of this character.

The detail construction of the impeller may be widely varied within the teachings of my invention, and I have shown, for example in Figs. 4 to 7 inclusive, the modified form in which the blades 91 are secured at their inner ends to split brackets 92 providing rounded studs 93 fitting into suitable sockets formed in the hub 94. The hub 94 is made in two parts 95 and 96, the main part of the hub being secured to the tapered end of the shaft 15 as previously described, and the outer part 96 comprising a ring member adapted to be clamped to the main part 95. The ring 96 and the main part 95 have semi-cylindrical recesses 97, 98 formed therein, and these recesses are adapted to embrace the studs 93 on the brackets 92—92, which receive the inner ends of the blades 91.

The studs 93 have heads 99 formed at their inner ends so as to prevent escape of the studs 93 from the grip of the hub. The brackets 92 are preferably formed in two identical parts held together by clamping bolts 100 upon the inner ends of the blades 91.

The ring 96 is held upon the main hub at 95 by a series of clamping bolts 101. By this arrangement the brackets 92 may be securely held in the hub. The brackets have bases 102 which seat upon flattened seats on the hub 94. By loosening the clamping bolts 101 the blades 91—91 may be rotated on the studs 93.

Figures 4, 5:
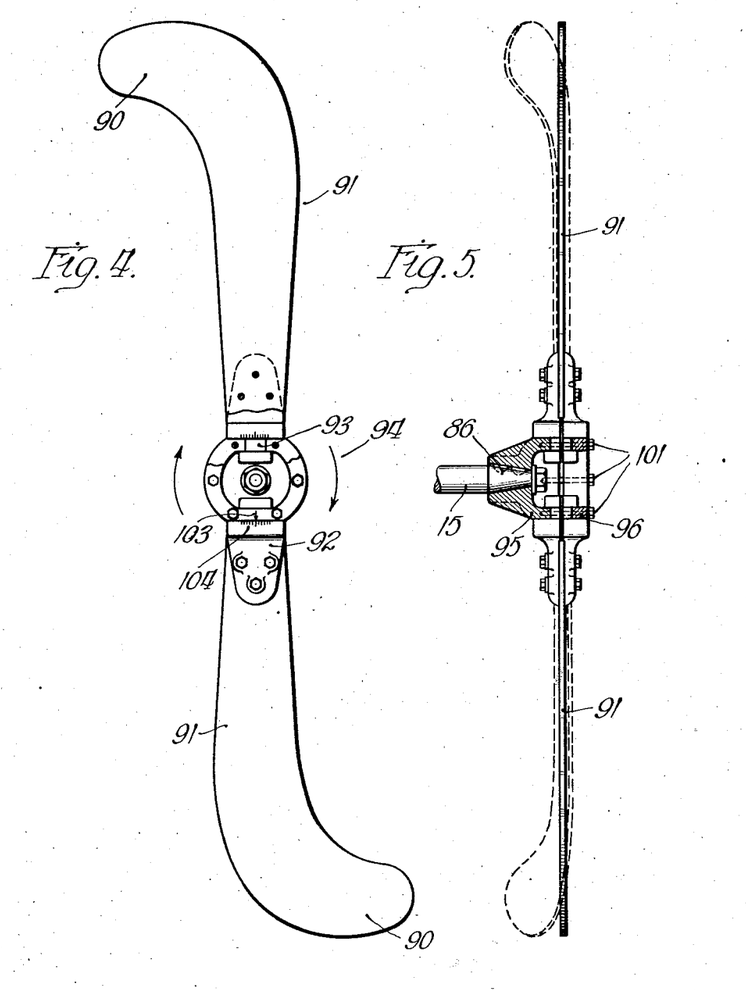
Fig. 4 is a front elevational view of an impeller embodying my invention.
Fig. 5 is an edgewise view partly in section of the same.

If desired an index mark, such as shown at 103, may be made at diametrically opposite points of the ring 106 and graduations 104 disposed on the bracket members 92 to indicate the angular setting of the blades and to permit ready adjustment to be made. Fig. 5 shows in full lines the blades 91 as disposed at zero pitch, that is, lying in a plane normal to the shaft 15. The dotted lines show the blades as disposed at a suitable pitch for extracting power from the wind.

Figure 6:
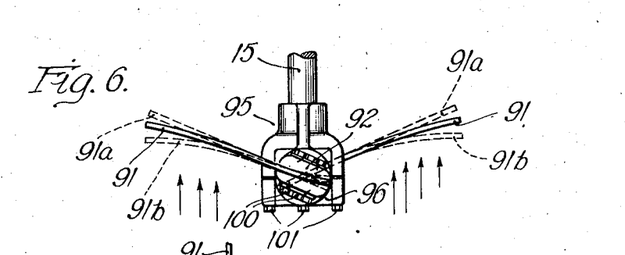
Fig. 6 is a top plan view of the impeller of my invention shown in Figs. 4 and 5.
Figure 7:
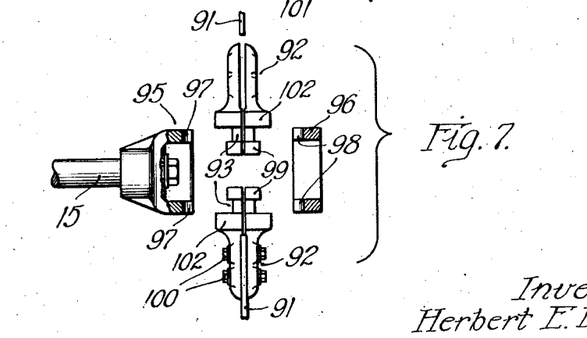
Fig. 7 is an exploded view of the components of the impeller.

Fig. 6 shows in dotted lines the mode of operation of a device of my invention. The blade 91 is shown in full line position where it would be set in normal position with no wind striking the same. In dotted line position as indicated at 91a is shown the position which the blade would occupy upon pressure of the wind, as indicated by the arrows in Fig. 6; and dotted line position 91b shows the position into which the blade may be moved upon rotating at a high speed where the flat end trails in the wind.

It is to be observed that not only does the rear end of the blade, that is, the flag end 90, change its angularity but the entire blade is twisted.

The blade may be a warped surface or it may be merely a flat surface set at an angle. I have found that a flat surface set at an angle and provided with the flag ends above referred to will find the proper position in the wind very efficiently.

When an impeller of my invention is to be employed with a mechanical speed reducer and a pump jack the same considerations prevail as prevail in driving an electric generator. When the impeller reaches a predetermined maximum velocity either with the electric generator as a load or with the pump jack as a load the impeller must be taken out of the wind for greater wind velocities to prevent excessive speed. This is done efficiently by the tail vane control above described. There is a peculiar relation between the tail vane control which I have described above and an impeller of this type in this—that the wind pressure in a head-on direction with respect to the impeller will increase relatively slightly with increased speeds of the impeller, and the wind vane control must be sensitive and must act efficiently to compensate for the decreased thrust of the wind upon the impeller as the impeller turns into an angular position and gets out of step with the wind. That is to say, there is not the same problem involved herein as in the old multi-vane wheel since in that case large pressures secured by large sail areas were employed, and the speed of the multi-vane wheel never approached the corresponding speed of the wind on the true screw propeller theory, with the result that as the wind velocities increased beyond the desired point for such wind wheels the wind wheel was turned out of the wind by a wind pressure which exceeded a predetermined spring pressure. In so turning out of the wind the old style wind wheel has presented a relatively less projected surface head-on to the wind, but has continued to operate due to the increased pressure. In other words, according to the previous practice, it has been desirable to present an increased spring pressure to the wheel as it turns more and more out of the wind, whereas in my power generating plant this would result in angular velocities which would burn up an electric plant or injure a mechanical plant such as a pumper. According to my construction the spring pressure for throwing the impeller into the wind decreases with increased angularity of the impeller with respect to the oncoming wind. This condition is magnified by the use of the flag end of the impeller blades where the impeller tends to increase its torque as it drops in speed.

It is customary to describe an impeller by referring to stations, that is, locations along its length. The outer tips occupy one station, which is one-fifth of the radial length of the blade. In my impeller the major part of the effective area falls within the first station due to the scimeter shape of blade. The blades being made of thin material which, while it is preferably metal, may be of other suitable material, have the so-called series motor torque speed characteristic that is under a given moving force which in the present case is the fluid stream or wind current. The torque is at maximum at standstill, and decreases with increased angular velocity.

When the blades are at standstill and under a given wind pressure due to the fluid stream in which the blades are placed, the flag ends at the outer station flex the blade, and due to its anchorage at the hub only, this flexing is progressive, that it, the change of inclination at the hub is at minimum and at the top of the flag end at maximum.

The impeller is placed sufficiently far in advance of the supporting tower to avoid eddy currents created by the presence of said tower in the wind currents.

As the impeller reaches its predetermined limit of speed corresponding to the maximum output, it moves out of the wind on an increasing radius due to the distance forward of the vertical axis at which the impeller stands. At the same time the gyroscopic effect becomes more pronounced and assists in taking the impeller out of the wind.

I, therefore, intend to claim broadly herein the combination of the two vane type of impeller with the wind vane control having a decreasing tension with increasing angularity of the impeller with respect to the wind.

I do not intend to be limited to details herein shown or described.

I claim:

1. An impeller of the type herein described and adapted for extracting power from the wind at relatively high speed having a flexible blade secured at its inner end to a supporting shaft, said blade having a flag end extending from the main body of the blade at its outer end in a direction rearwardly with reference to the direction of rotation of blade and being adapted under wind pressure to change the pitch of the blade.

2. A rotary fluid stream-driven impeller having blades of thin sheet material disposed at a small angle to the plane of rotation, said blades having trailing flag portions on the outer ends affording sufficient area for the impact of the fluid stream to twist the blades to change their angle of inclination with respect to the plane of rotation.

3. In a fluid current driven impeller, a blade adapted to be anchored at its inner end and flexible throughout its length, said blade having greater area per unit length at its outermost station than at the other stations, said area being disposed mainly on the trailing side of the longitudinal axis of the blade and flexed out of its normal position by impact pressure of the fluid stream.

4. A wind driven impeller adapted to be disposed in a wind stream and be driven thereby and comprising a thin sheet metal blade relatively long and narrow, and having a trailing portion at the outer edge of the blade, said portion increasing the exposed area at the outer end of the blade to increase the starting torque thereof at low wind speeds, and said portion being flexed, with reference to the body of the blade, by impact of the wind at high wind speeds to reduce the power extracting effect of that portion at high speeds.

5. A wind driven impeller adapted to be disposed in a wind stream and being driven thereby and comprising a thin, relatively long and narrow sheet metal blade and having an extended flag portion at the trailing side of the outer peripheral edge thereof to increase the exposed area at the outer edge of the blade and place the section of maximum efficiency of the blade, upon starting, at the outer periphery thereof, said flag portion being flexed, with reference to the body of the blade, by impact of the wind at high wind speeds to cause the flag portion to trail in the wind stream and produce a retarding effect upon the impeller.

In witness whereof, I hereunto subscribe my name this 7th day of March, 1928.

HERBERT E. BUCKLEN.